United States Patent
Dugan et al.

(10) Patent No.: US 12,141,144 B2
(45) Date of Patent: *Nov. 12, 2024

(54) COLUMN LINEAGE AND METADATA PROPAGATION

(71) Applicant: Palantir Technologies Inc., Palo Alto, CA (US)

(72) Inventors: Christopher Dugan, Bronx, NY (US); Aditya Chaturvedi, San Fransisco, CA (US); David Vogelbacher, New York, NY (US); Jiawei Wu, London (GB); Natacha Gabbamonte, Brooklyn, NY (US); Joseph Kane, Cardiff (GB)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/110,283

(22) Filed: Feb. 15, 2023

(65) Prior Publication Data

US 2023/0195728 A1    Jun. 22, 2023

Related U.S. Application Data

(63) Continuation of application No. 16/287,631, filed on Feb. 27, 2019, now Pat. No. 11,599,539.

(Continued)

(51) Int. Cl.
*G06F 16/2453* (2019.01)
*G06F 16/28* (2019.01)
(Continued)

(52) U.S. Cl.
CPC ...... *G06F 16/24542* (2019.01); *G06F 16/288* (2019.01); *G06F 16/907* (2019.01); *G06F 21/6218* (2013.01)

(58) Field of Classification Search
CPC ............ G06F 16/24542; G06F 16/288; G06F 16/907; G06F 21/6218; G06F 16/2455
See application file for complete search history.

(56) References Cited

U.S. PATENT DOCUMENTS

| 6,167,405 A | 12/2000 | Rosensteel, Jr. |
| 6,343,295 B1 | 1/2002 | MacLeod |

(Continued)

FOREIGN PATENT DOCUMENTS

| CN | 105630789 A | 6/2016 |
| EP | 3647918 B1 | 5/2020 |

OTHER PUBLICATIONS

Scherbaum J, Novotny M, Vayda O. Spline: Spark lineage, not only for the banking industry. In2018 IEEE International Conference on Big Data and Smart Computing (BigComp) Jan. 15, 2018 (pp. 495-498). IEEE.

(Continued)

*Primary Examiner* — Cheyne D Ly
(74) *Attorney, Agent, or Firm* — Faegre Drinker Biddle & Reath LLP—Palantir

(57) ABSTRACT

Whether a logical query plan to derive a target dataset from one or more source datasets is available is determined. Responsive to determining that the logical query plan is not available for the transformation code in the first programming language, relationships between the source columns of the one or more source datasets and the respective target columns of the target dataset are inferred. Target column metadata for a target column of the target dataset is generated. The target column metadata reflects the inferred relationships between the source columns of the one or more source datasets and the respective target columns. The target column metadata for the target column of the target dataset is stored.

20 Claims, 7 Drawing Sheets

Related U.S. Application Data

(60) Provisional application No. 62/785,010, filed on Dec. 26, 2018.

(51) Int. Cl.
    *G06F 16/907*     (2019.01)
    *G06F 21/62*     (2013.01)

(56) References Cited

U.S. PATENT DOCUMENTS

| | | |
|---|---|---|
| 6,604,110 B1 | 8/2003 | Savage |
| 6,804,667 B1 | 10/2004 | Martin |
| 7,058,631 B1 | 6/2006 | Pal |
| 7,350,191 B1 | 3/2008 | Kompella |
| 9,607,063 B1 | 3/2017 | Cao |
| 9,734,180 B1 | 8/2017 | Graham |
| 10,866,866 B2 | 12/2020 | Zhu |
| 11,599,539 B2 | 3/2023 | Dugan et al. |
| 2002/0147725 A1 | 10/2002 | Janssen et al. |
| 2004/0158556 A1 | 8/2004 | Dettinger |
| 2006/0080287 A1 | 4/2006 | Majd |
| 2006/0200439 A1 | 9/2006 | Bhatia |
| 2006/0294051 A1 | 12/2006 | Kapadia |
| 2007/0192170 A1 | 8/2007 | Cristol |
| 2008/0040388 A1 | 2/2008 | Petri |
| 2008/0140696 A1 | 6/2008 | Mathuria |
| 2008/0147599 A1 | 6/2008 | Young-Lai |
| 2008/0270350 A1 | 10/2008 | Bojanic |
| 2009/0327208 A1 | 12/2009 | Bittner |
| 2016/0314170 A1 | 10/2016 | To |
| 2017/0169097 A1* | 6/2017 | Petri .................. G06F 9/46 |
| 2019/0004775 A1 | 1/2019 | Vasisht |
| 2019/0146970 A1* | 5/2019 | Chamieh .......... G06F 16/24542 707/718 |
| 2019/0220464 A1* | 7/2019 | Butani .................. G06F 16/283 |

OTHER PUBLICATIONS

Ashish Thusoo et al: "Hive—a petabyte scale data warehouse using Hadoop", Data Engineering (ICDE), 2010 IEEE 26th International Conference On, IEEE, Piscataway, NJ, USA, Mar. 1, 2010 (Mar. 1, 2010), pp. 996-1005, ISBN: 978-1-4244-5445-7.

Jason Brimhall et al: "Stored Procedures" In: "SOL Server 2012 T-SQL Recipes: A Problem-Solution Approach", Sep. 11, 2012 (Sep. 11, 2012), Apress, ISBN: 978-1-4302-4200-0 pp. 363-382.

Pethuru Raj et al: "Visualization Dimensions for High Performance Big Data Analytics" In: "Wireless Sensors in Heterogeneous Networked Systems", Oct. 17, 2015 (Oct. 17, 2015), Springer International Publishing, Cham, XP055510436, ISSN: 1617-7975, ISBN: 978-3-319-09280-5, pp. 339-365.

European Patent Application No. 18179100.5 Partial European Search Report mailed Aug. 13, 2018, 5 pages.

European Patent Application No. 18179100.5. European Search Report mailed Oct. 9, 2018, 3 pages.

\* cited by examiner

COLUMN LINEAGE AND METADATA PROPAGATION

RELATED APPLICATION

This application is a continuation application of U.S. patent application Ser. No. 16/287,631, filed Feb. 27, 2019, which claims the benefit of U.S. Provisional Application No. 62/785,010, filed Dec. 26, 2018, the entire contents of both are hereby incorporated by reference herein.

TECHNICAL FIELD

This disclosure relates to the field of data aggregation and analysis systems, and in particular to column metadata generation for a dataset.

BACKGROUND

Modern data centers often comprise thousands of hosts that operate collectively to service requests from even larger numbers of remote clients. During operation, components of these data centers can produce significant volumes of machine-generated data. A computerized data pipeline is a useful mechanism for processing those large amounts of data. A typical data pipeline is an ad-hoc collection of computer software scripts and programs for processing data extracted from "data sources" and for providing the processed data to "data sinks." As an example, a data pipeline for a large insurance company that has recently acquired a number of smaller insurance companies may extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

Given the increasing amount of data collected by businesses and other organizations, processing data of all sorts through data pipeline systems can only be expected to increase. This trend is coupled with a need for a more automated way to maintain such systems and for the ability to trace and track data, including various versions of the data, as it moves through the data pipeline from data sources to data sinks.

BRIEF DESCRIPTION OF THE DRAWINGS

The present disclosure will be understood more fully from the detailed description given below and from the accompanying drawings of various embodiments thereof, which, however, should not be taken to limit the present disclosure to the specific embodiments, but are for explanation and understanding only.

DETAILED DESCRIPTION

Figure 1:
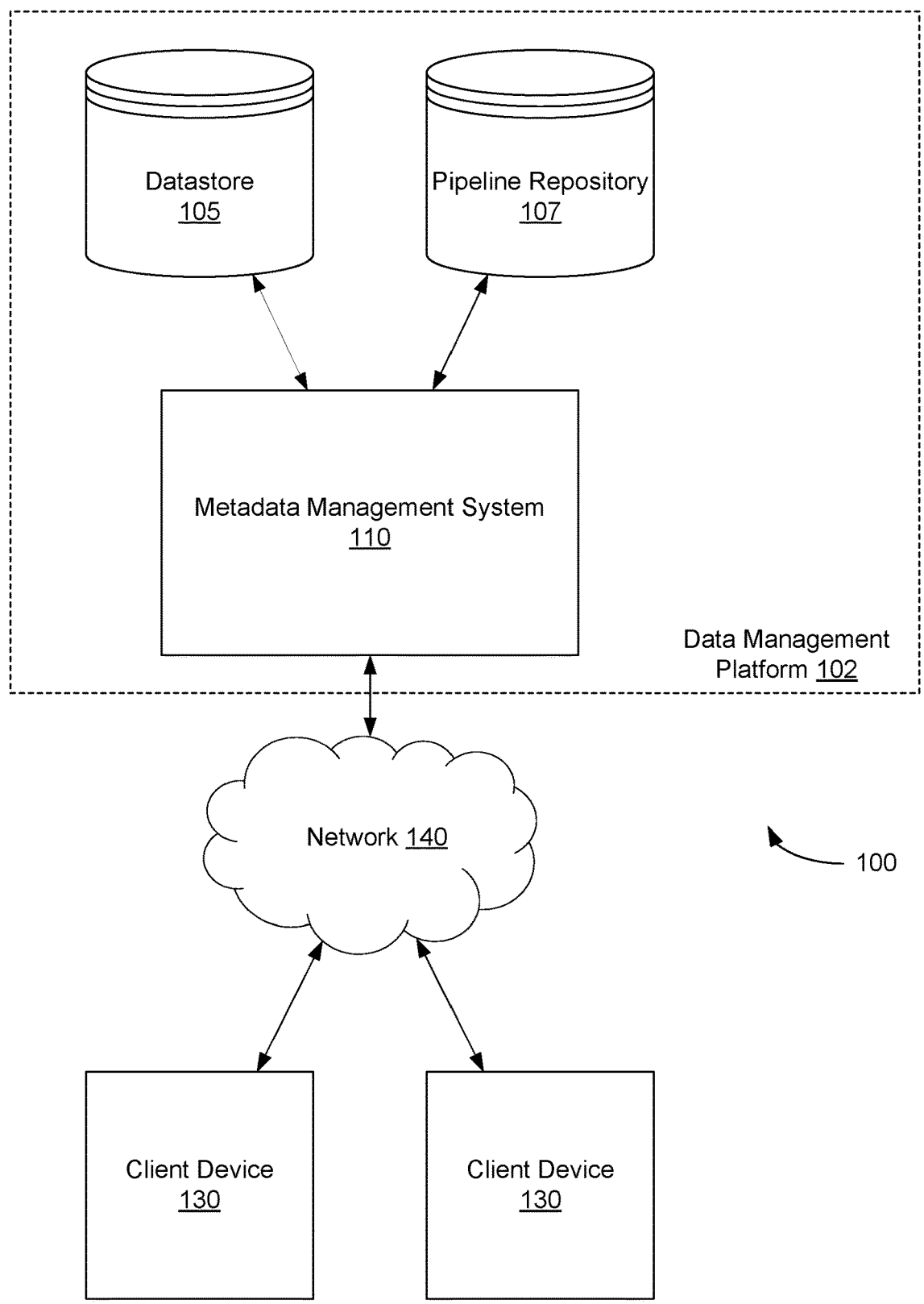
FIG. 1 is a block diagram illustrating a network environment in which a metadata management system may operate, in accordance with some embodiments.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Aspects of the present disclosure are directed to metadata generation for columns of a dataset. The dataset may be used or created as part of a data pipeline. A data pipeline may refer to an ordered set of logic (e.g., a collection of computer software scripts or programs) that performs a multi-step transformation of data obtained from data sources to produce one or more output datasets. Each data transformation step applies transformation code to one or more source datasets (i.e. collections of enterprise data) to produce one or more target datasets. For example, the transformation code can be software code, such as a script, that defines a set of instructions to transform source columns of one or more source datasets into target columns of one or more target datasets. In a data pipeline, the source dataset can result in hundreds if not thousands of derived (target) datasets. For instance, in a first data transformation step of the data pipeline, first transformation code can be applied to the source dataset which represents the starting point of the data pipeline, transforming the source dataset into one or more target datasets. The target dataset(s) can be further transformed using second transformation code to provide one or more other target datasets as input to the next data transformation step using different transformation code, and so forth.

Columns in a dataset can be associated with column metadata that provides information about a particular column. Column metadata can include user comment metadata (e.g., user comments for a respective column), and column level access control metadata (e.g., policy to restrict access to a respective column or the data therein to persons or operations having adequate authority). In addition, column metadata can include column lineage metadata, which describes a column's provenance (also referred to as "lineage" herein), such that the column lineage metadata identifies the origins and history of a column through the column's life cycle (e.g., from the source column(s) in the first source dataset to the target column in a target dataset from a particular data transformation step in the data pipeline). For instance, column lineage metadata can describe each transformation step of column through its life cycle and at each transformation step can describe the source column(s) in one or more source datasets used to generate one or more columns in one or more target datasets, identify the history (e.g., earlier iterations or transformations) of the source column(s), identify how the source column(s) were transformed (e.g., renamed, database operations, function, etc.), and identify the transformation code used at the transformation step. Provenance of a dataset, and in particular column provenance of columns of a dataset, can help users or systems determine whether a given dataset is trustworthy. An error or mistake in a dataset can propagate through the data pipeline if left uncorrected. Such an error or mistake can cause many problems including, for example, inaccurate data, failure of downstream processes that rely on the dataset, and so forth. Column lineage metadata provides granularity with respect to a column's history, which can be invaluable for identifying and correcting propagated errors in datasets.

In conventional systems, column metadata is not typically propagated from the source column(s) of the source dataset(s) to the target column(s) of the target dataset(s) subsequent to a transformation step performed on the source dataset(s). Users can manually propagate column metadata, but the sheer number of derived datasets, and derived columns therein, makes manual propagation of column metadata prohibitive. If the first source dataset or any intermediate dataset does not include column lineage metadata for any of its columns (e.g., it was not readily available to the user or the user simply forgot to include it), then column lineage cannot be ascertained or included for the target column(s) of subsequent target dataset(s). Further, column level access control policies (e.g., controlling the access to data of a column to certain users or programs) are often associated with column metadata. If a system does not propagate column level access control metadata to downstream datasets, the data of such columns can lose its desired security level, which can negatively affect privacy and downstream processes, and expose sensitive data, among others.

Further, the transformation code in a data pipeline can potentially be written by different software developers using many different programming languages. A user who is selecting the transformation code for a certain data transformation step of the data pipeline may not be familiar with all of the different programming languages, and therefore may not be able to understand what the column lineage metadata should be. Moreover, only the most recent part of a column's lineage can be directly obtained from transformation code (e.g., for a particular data transformation step). If only the most recent part of the column's lineage is used to create column lineage metadata, the column lineage metadata will be incomplete.

Aspects of the present disclosure address the above and other challenges by automatically generating target column metadata for a target column of a target dataset using derived relationships between source column(s) of one or more source datasets and respective target column(s) of one or more target dataset(s). In embodiments, the generated target column metadata can include user comment metadata, column level access control metadata, or column lineage metadata, among others.

According to some aspects of the disclosure, the relationships between source column(s) of one or more source datasets and respective target column(s) of one or more target dataset(s) can be derived from a logical query plan. A logical query plan can refer to an ordered set of operations that is used to access data from one or more source datasets to generate one or more target datasets. As will be discussed in more detail below, a logical query plan can be generated from transformation code that is written in any of a variety of programming languages. The logical query plan may have a particular syntax that is the same irrespective of the programming language of the transformation code. As such, the logical query plan is agnostic with respect to the programming language of the transformation code.

In some embodiments, the logical query plan can be parsed to derive relationships between the source columns of the source datasets and the respective target columns of the target datasets. The derived relationships can be used to generate target column metadata (e.g., current column lineage metadata). Further, existing column metadata of the source columns (e.g., existing column lineage metadata, column level access control metadata, or user comments) can be also included in the generated target column metadata to provide metadata of all ancestors of the target column in one place.

According to other aspects of the disclosure, the relationships between source column(s) of one or more source datasets and respective target column(s) of one or more target dataset(s) can be inferred using specified rules or a machine learning model trained to recognize such relationships. Such inferences can be based, for example, on similar column names, matching column data types (e.g., character, integer, Boolean, etc.), matching column statistics types (e.g., average, maximum, minimum, etc.), and so forth.

Accordingly, the technology described herein allows for the automatic generation of target column metadata for a target column of a target dataset. The target column metadata can reflect a derived relationship between one or more source columns and the target column(s) and existing source column metadata of each of the one or more source columns. The generated target column metadata can include user comment metadata, column level access control policy metadata, or column lineage metadata. Automatically generating target column metadata that includes column lineage metadata improves the trustworthiness of a dataset and aids in the detection and correction of errors, which improves overall system performance. Additionally, the technology herein propagates column level access control polices from one or more source columns to a respective target column, which enables improved data security. Furthermore, using the programming language agnostic logical query plan to derive relationships between one or more source columns and the target column allows for the generation of column lineage metadata and preserves storage resources, computational resources, and memory resources by decreasing the software overhead, which would be otherwise required to analyze transformation code expressed in a variety of programming languages.

FIG. 1 is a block diagram illustrating a network environment in which a metadata management system may operate, in accordance with some embodiments. The network environment 100 can include one or more client devices 130 and a data management platform 102, which can be in data communication with each other via network 140. Computer system 600 illustrated in FIG. 6 may be one example of any of client devices 130 or a server(s) in the data management platform 102. The network 140 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability.

Data management platform 102 may include, for example, a server computer or any other system providing computing capability. Alternatively, data management platform 102 may employ a plurality of computing devices that may be arranged, for example, in one or more server banks or computer banks or other arrangements. Such computing devices may be positioned in a single location or may be distributed among many different geographical locations. For example, data management platform 102 may include a plurality of computing devices that together may comprise a hosted computing resource, a grid computing resource or any other distributed computing arrangement. In some cases, data management platform 102 may correspond to an elastic computing resource where the allotted capacity of processing, network, storage, or other computing-related resources may vary over time.

In some embodiments, data management platform 102 can include metadata management system 110, datastore 105 storing the underlying data (e.g., enterprise data), and pipeline repository 107 storing one or more data pipelines. A data pipeline includes a set of logic to execute a series of data transformation steps on one or more source datasets stored in datastore 105. Each data transformation step produces one or more target datasets (also referred to herein as "derived datasets") that may also be stored in datastore 105.

As noted above, transformation code used in a data transformation step can be software code, such as a script, that defines a set of instructions to transform one or more source datasets into a target dataset. The transformation code, upon execution, can read, select, or extract data from one or more source datasets at datastore 105 and transform or validate or write the data in some way to a target dataset. After execution, the transformation code can be stored at pipeline repository 107 and be re-used to recreate the target dataset or create a new target dataset. In some embodiments, the transformation code can be written in one of multiple programming languages. In some embodiments, the transformation code is capable of carrying out Spark™ transformations on a dataset.

In embodiments, a target dataset (also referred to as "derived dataset" or "child dataset" or "output dataset" herein) can refer to a dataset that is derived or transformed from data of one or more source datasets. A source dataset (also referred to as "initial dataset(s)" or "parent dataset(s)" or "input dataset(s)" herein) is a dataset that is used to generate or derive a target dataset. It can be noted that a target dataset can become a source dataset. For example, subsequent to generating a first target dataset, a second target dataset can be generated using the first target dataset (e.g., which becomes a source dataset of the second target dataset), and so forth.

Depending on the embodiment, datastore 105 and pipeline repository 107 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The pipeline repository 107 may be part of the datastore 105 or may be a separate repository including, for example, a database, one or more tables, one or more files, etc.

Datastore 105 may include structured or unstructured sets of data that can be divided or extracted for provisioning when needed by one or more components of the metadata management system 110. Datastore 105 may include one or more versioned datasets of information. The dataset(s) may be stored in one or more databases, such as a relational database. A relational database may organize information or data into tables, columns, rows, or other organizational groupings. Groupings of information may be linked or referenced via use of keys (e.g., primary and foreign keys).

In one embodiment, the datasets in datastore 105 are both "immutable" and "versioned" datasets. A dataset may be defined as a named collection of data. The datasets are "immutable" in the sense that it is not possible to overwrite existing dataset data in order to modify the dataset. The datasets are "versioned" in the sense that modifications to a dataset, including historical modifications, are separately identifiable.

Because datasets are immutable and versioned, it is possible to determine the data in a dataset at a point in time in the past, even if that data is no longer in the current version of the dataset. More generally, the ability to trace dataset data to the data source data from which the dataset data was derived or obtained, even if the dataset data is no longer in the current version of the dataset and even if the data source data is no longer available from the data source, is maintained.

A source dataset may be raw (i.e., un-edited) data that comes directly from a data source (e.g., a full list of customer accounts) and represents the starting point of a data pipeline. Alternatively, a source dataset may be a target dataset, which is a dataset that is generated (i.e., built) by editing (e.g., manually or by executing logic of a data transformation step from pipeline repository 107) one or more source datasets. A target dataset may be potentially further transformed to provide one or more other datasets as input to the next data transformation step. Each data transformation step may perform one or more operations on the input dataset(s) to produce a target dataset. For example, a data transformation step may produce a target dataset by filtering records in an input dataset to those comprising a particular value or set of values, or by joining together two related input datasets, or by replacing references in an input dataset to values in another input dataset with actual data referenced. Because target datasets, like datasets generally, are immutable and versioned in the system, it is possible to trace dataset data to the data source data from which the dataset data was derived or obtained, even if the dataset data is no longer in the current version of the target dataset and even if the data source data is no longer available from the data source.

In one embodiment, transformation code stored in pipeline repository 107 is also versioned. Doing so, not only provides the ability to trace dataset data to the data source data the dataset data is based on, but also, if the dataset is a target dataset, to the version of the transformation code used to build the target dataset. This can be useful for tracking down errors in dataset data, such as those caused by errors or "bugs" (i.e., programming errors) in the version of the transformation code that was executed to build the dataset.

In some embodiments, the data management platform 102 can store information identifying a history of a dataset(s). The information identifying the history of a particular dataset can be part of or a portion of the data pipeline, such that information identifying the history of a dataset can identify a series of data transformation steps starting with one or more source datasets and ending on the most current version of a dataset(s). The data pipeline portion that records the history of a particular dataset(s) may include one or more pointers to one or more snapshots of one or more source datasets from datastore 105, first transformation code from pipeline repository 107, and one or more pointers to one or more snapshots of one or more first target datasets from datastore 105 resulting from applying the first transformation code to the one or more initial datasets. A snapshot of a dataset (e.g., a source dataset or a target dataset) captures the state of the corresponding dataset at the point in time that the snapshot was created (e.g., the point in time when the data pipeline portion was created, when the source dataset was added to the data pipeline portion, or when the target dataset was created. As datastore 105 has versioned datasets, each version of a given dataset may represent a corresponding snapshot. For example, each time a change is made to a given dataset, a new version of that dataset (and corresponding snapshot) may be created and stored in datastore 105. Any changes made to the source dataset by other programs or logic accessing datastore 105 after the snapshot is captured will not affect the snapshot being worked on in the data pipeline portion. In one embodiment, the data pipeline portion includes a pointer to the snapshot, which is physically stored in datastore 105. The pointer may include a computing object that stores a reference to the corresponding snapshot, such as a memory address of the snapshot in datastore 105, a unique identifier of the snapshot, or some other indicative value. Similarly, the data pipeline portion may include one or more pointers to one or more snapshots of any target datasets resulting from execution of the transformation code against the one or more source datasets or other previously derived target dataset(s).

In some embodiments, metadata management system 110 of data management platform 102 can generate and store target column metadata of a target column of a target dataset. The target column metadata can include various metadata items such as user comment metadata, column level access control metadata, or column lineage metadata. Operations of metadata management system 110 are further described herein in the following Figures.

Figure 2:
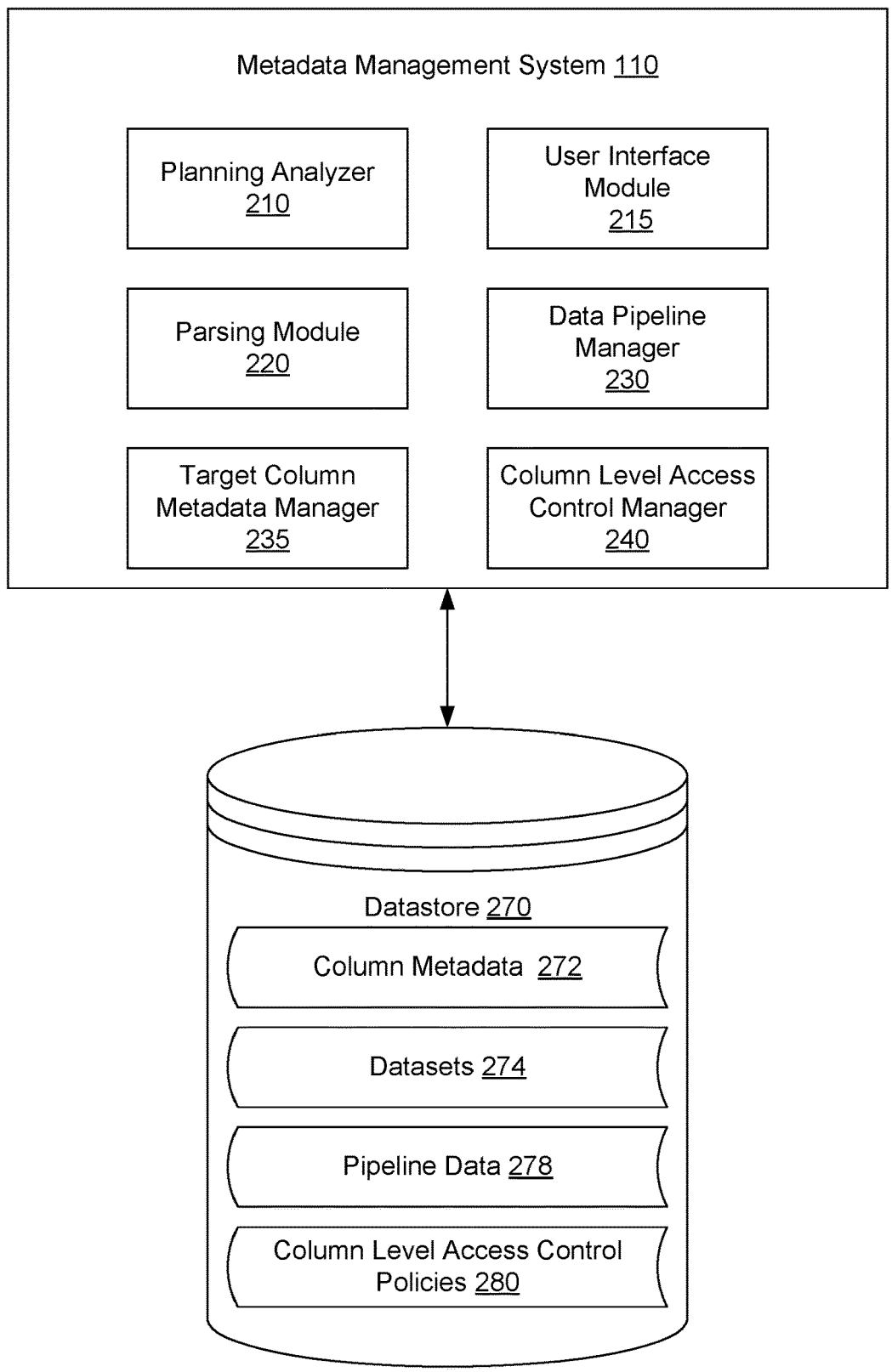
FIG. 2 is a block diagram illustrating a metadata management system, in accordance with some embodiments.

FIG. 2 is a block diagram illustrating metadata management system 110, in accordance with some embodiments. Metadata management system 110 may include planning analyzer 210, user interface module 215, parsing module 220, data pipeline manager 230, target column metadata manager 235, and column level access control manager 240.

In one embodiment, datastore 270 is connected to metadata management system 110 and includes column metadata 272, datasets 274, pipeline data 278, and column level access control policies 280. This arrangement of modules and components may be a logical separation, and in other embodiments, these modules or other components can be combined together or separated in further components, according to a particular embodiment. Elements of FIG. 1 are used to help describe aspects of FIG. 2.

In one embodiment, a single computer system (e.g., data management platform 102) may include both metadata management system 110 and datastore 270. In another embodiment, datastore 270 may be external to the computer system and may be connected to metadata management system 110 over a network or other connection. In other embodiments, metadata management system 110 may include different or additional components which are not shown here to simplify the description. Datastore 270 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Datastore 270 may be part of datastore 105 or pipeline repository 107 or be separate from datastore 105 or pipeline repository 107 of FIG. 1.

As discussed above, metadata management system 110 generates column metadata for columns of a target dataset derived from one or more source dataset. In some embodiments, such column metadata is generated when a target dataset is created (e.g., as part of a data transformation step of a data pipeline) by application of transformation code to one or more source datasets. For example, a user can enter or select transformation code in a graphical user interface (GUI) displayed at client device 130 and provided by user interface module 215 and request that the transformation code be executed on one or more source datasets. In another example, the transformation code can be defined for each data transformation step of a data pipeline in advance and executed as part of the data pipeline automatically at a particular time or in response to a predetermined event.

In some embodiments, the transformation code can be in a first programming language of multiple programming languages. The transformation code can specify the source dataset(s), source columns of the source dataset(s), one or more target dataset(s), one or more target columns of the target dataset(s), and one or more operations or functions to be performed on the source columns or a mapping between a name(s) of one or more source columns and a name(s) of a respective target column(s). In some embodiments, transformation code can be written using any of a variety of different programming languages.

In some embodiments, planning analyzer 210 of metadata management system 110 can receive or identify transformation code in a particular programming language in response to a dataset creation event. For example, planning analyzer 210 can receive or identify the transformation code when the user provides it in the GUI, requests it to be executed, and a target dataset is created as a result. In another example, planning analyzer 210 can receive or identify the transformation code when it is executed as part of a data transformation step of the data pipeline, resulting in creation of a target dataset. Planning analyzer 210 can parse and convert the transformation code into a logical query plan. As noted above, a logical query plan (also referred to as "logical plan" herein) can refer to an ordered set of operations that is used to access data from one or more source datasets to generate one or more new target datasets. The logical query plan can be a hierarchical structure expressed as a tree of nodes of logical operators (e.g., relational algebraic expression). In some embodiments, the logical query plan can have a particular syntax suitable for interpretation or execution by metadata management system 110. As noted above, the logical query plan can be agnostic with respect to the programming language used for the transformation code. For example, the planning analyzer 210 can process different transformation code in various programing languages and generate a logical query plans having the same syntax. The planning analyzer 210 can have a module or plugin for each programming language of the transformation code. Prior to processing the transformation code, the planning analyzer 210 can determine the programming language used for the transformation code (e.g., based on description or metadata associated with the transformation code and/or the syntax of the transformation code), and invoke a module or plugin designated for the determined programming language to process the transformation code.

In some implementations, planning analyzer 210 can produce one or more types of logical query plans, such as a parsed logical query plan, analyzed logical query plan, or optimized logical query plan, as well as a physical query plan. Planning analyzer 210 can generated a parsed logical query plan by converting the text string of the transformation code into a parse tree data structure. In generating the parsed logical query plan, the planning analyzer 210 can also check the query for correctness (e.g., check for syntax, access control, dataset names, etc.). To generate an analyzed logical query plan, planning analyzer 210 can apply a series of rules to convert the parse tree of the parsed logical query plan into the analyzed logical query plan (e.g., relational algebraic expression) having a particular syntax. Planning analyzer 210 can apply a set of optimization rules to the analyzed logical query plan to produce the optimized logical query plan. For example, the planning analyzer 210 can reduce a task that is described as using two filters in the analyzed logical query plan to a task using one filter in the optimized logical query plan by applying the set of optimization rules. The physical query plan can specify the order or grouping of database operators (e.g., join, union, etc.), an algorithm for each operator, and add additional operators that are needed for the physical plan but not explicitly described in the optimized logical query plan. Logical query plan can refer to an analyzed logical query plan herein unless otherwise described. It can be noted that in other embodiments, any one or more of the types of logical query plans can be used for operations described herein.

Parsing module 220 can parse logical query plans generated by planning analyzer 210. For example, parsing module 220 can receive the logical query plan from planning analyzer 210. In another example, parsing module 220 can retrieve the logical query plan that is stored at datastore 270. Parsing module 220 can parse the logical query plan to derive relationships between source columns of one or more datasets and respective target columns of the target dataset(s) that are identified in the logical query plan. Additional details regarding parsing of the logical query plan are further described with respect to FIG. 3A.

In some embodiments, parsing module 220 can generate, based on the parsing, a preliminary relationship representation or model that identifies the derived relationships (e.g., from the logical query plan) between the source columns of the source dataset(s) and the respective target columns of the target dataset(s). For example, the preliminary relationship representation can identify the source dataset(s), the source columns in the source dataset(s), the target dataset(s), one or more target columns of the target dataset(s), and relationships between the source columns of the source dataset(s) and respective target columns of the target dataset(s). Additional details regarding preliminary relationship representation of the derived relationships is further described with respect to FIG. 3B (e.g., derived relationships model 350 of FIG. 3B).

In some embodiments, a logical query plan may not be always available for the transformation code. For example, the planning analyzer 210 may not support the programming language of the transformation code and not be able to generate a logical query plan for the transformation code. Responsive to determining that the logical query plan is not available for the transformation code in the first programming language, target column metadata manager 235 can infer the relationships between the source columns of the source dataset(s) and the columns of the target dataset(s). Inferring the relationships between the source columns of the one or more source datasets and the columns of the target dataset is further described with respect to FIG. 4.

Based the inferred relationships or the relationships determined from the logical query plan, target column metadata manager 235 can generate target column metadata for a target column of the target dataset. The target column metadata can be stored as column metadata 272 of datastore 270.

In some embodiments, the target column metadata can include column lineage metadata. As noted above, the column lineage metadata can describe a column's provenance. The column lineage metadata can include the most recent column lineage metadata (e.g., also referred to as "recent column lineage metadata" herein) and existing column lineage metadata. The recent column lineage metadata can reflect the most recently derived relationship (based on the logical query plan or the inference analysis) between one or more source columns and the target column. For example, the recent column lineage metadata for a target column can describe one or more source columns and one or more database operations used on the source columns to produce the respective target column. The existing lineage metadata can include the history of the transformation of the column throughout its life cycle before the most recent transformation. A database operation (also referred to as "relational operator" herein) can refer to a particular type of data manipulation from one or more entities, such as one or more source columns. In some instances, database operations can be defined by the database system. Examples of database operations include, but are not limited to, Select, Join, Union, Project, Product, Intersect, Difference, Divide, or their variants (e.g., LeftOuterJoin).

In an example of column lineage metadata, dataset A includes column X. Column X is an initial column (e.g., raw data that has not undergone any pervious transformations). At a first point in time, transformation code J applied to dataset A results in transformation of column X of dataset A into column Y of dataset B. A logical query plan is generated and subsequently parsed to derive relationships between the source column (e.g., column X) of the source dataset (e.g., dataset A) and the target column (e.g., column Y) of the target dataset (e.g., dataset B). Target column metadata, in particular current column lineage metadata, is generated for the target column, column Y. Since column Y is the first transformation of the column X, existing column metadata is not available and is not included in the current target column metadata. For instance, the current target column metadata can indicate that column Y was derived from column X of dataset A using transformation code J on date K, at time L, by person M. The current target column metadata can be stored with the dataset Y or a pointer can be stored with dataset B, and the pointer can point to the target column metadata for column Y, which can be stored as part of column metadata 272 at datastore 270. Datasets A and B can be stored as part of datasets 274 of datastore 270.

At a second point in time after dataset B has been created, transformation code N can result in transformation of column Y of dataset B into column Z of dataset C. A logical query plan is generated and subsequently parsed to derive relationships between the source column (e.g., column Y) of the source dataset (e.g., dataset B) and the target column (e.g., column Z) of the target dataset (e.g., dataset C). Target column metadata, in particular column lineage metadata, is generated for the target column, column Z. The column lineage metadata can identify the currently derived relationship between the source column and the target column, and the existing column lineage metadata of column Y. For instance, the column lineage metadata can indicate the most currently derived relationship (e.g., that column Z was derived from column Y of dataset B using transformation code N on date O, at time P, by person Q) and the existing column lineage metadata for column Y that is stored at column metadata 272 at datastore 270 (e.g., that column Y was derived from column X of dataset A using function J on date K, at time L, by person M). The current column lineage metadata and the existing column lineage metadata can be combined to form complete column lineage (e.g., column lineage metadata) of the column Z. It can be understood that the process can continue for the life cycle of column, such that the lineage metadata for the particular column reflects the provenance for the particular column.

In some implementations, target column metadata manager 235 can use a set of rules defining how to propagate existing source column metadata into the target column metadata. For example, the rules may specify that if a source column only has one ancestor (the source column was previously derived from a single upstream source column), then existing column metadata of such a source column should be always propagated into the target column metadata of the respective target column. The rules may also specify, for example, that if a source column has multiple ancestors of different types (the source column was previously derived from multiple upstream source columns with different type classes), then existing column metadata of source columns of the same type as the target column should only be propagated into the target column metadata of the target column. In another example, the rules may specify that that if a source column has multiple ancestors, then existing column metadata of the source columns should be always propagated into the target column metadata of the target column, irrespective of the types of the source columns.

The existing column lineage metadata associated with the one or more source columns can be retrieved from column metadata 272 of datastore 270 based on identifiers of the one or more source columns.

In embodiments, target column metadata manager 235 can combine or concatenate the current column lineage metadata with the existing column lineage metadata to form the complete column lineage metadata for the particular target column. Target column metadata manager 235 can store the column lineage metadata at column metadata 272 of datastore 270. Target column metadata manager 235 can associate the target column metadata with the particular target column of the target dataset by, for example, storing the target column metadata with the target column or target dataset, or associating the target column with a pointer to target column metadata stored at datastore 270.

In embodiments, column lineage metadata can include various pieces of information describing a column's lineage. For example, the current column lineage metadata can include a name or unique identifier of the target column and a name or unique identifier of the target dataset. If the target column was derived from one or more other source columns, the current column lineage metadata can include, for each of the source columns, the name or unique identifier of the source column(s) and the name or unique identifier of the source dataset(s). If the target column was derived using transformation code, the current column lineage metadata can include the name or identifier of the transformation code that was used to derive the target column. The current column lineage can include information about the mapping, database operation (e.g., join, union, etc.), or function (e.g., average, divided by, etc.) that was performed on the one or more source columns to generate the target column. The existing column lineage metadata can include similar information but reflect each previous transformation step (e.g., source column(s) used to derive a respective target column) of the column in its life cycle.

In some implementations, column lineage of a target column can be represented as a graph the defines the relationships between the source column(s) and the target column, in which the nodes represent the columns, and the edges represent the derivation dependency (e.g., mapping, database operation, function) between the columns, such that if two nodes are connected by the edge, then the column referenced by the second node is a child of the column referenced by the first node, and the edge connecting the two nodes indicates the derivation dependency between the two columns. When the column lineage of the target column includes existing column lineage metadata of the source column(s), additional nodes and edges are included in the graph to represent ancestors of the source column(s) and their respective derivation dependencies. The graph representing the column lineage of the target column can be stored as column metadata 272 in datastore 270.

In some embodiments, existing source column metadata (that is included as part of the target column metadata) can include user comment metadata. User comment metadata can refer to user comments that are associated with a respective source column. For example, a user can manually input into the column metadata some information with respect to the column. For instance, the user can input "The data of this column includes an offset of X degrees." The user input, "The data of this column includes an offset of X degrees" can be propagated to respective derived column(s) as the column is transformed throughout the column's life cycle. In some embodiments, a user can select via a graphical user interface whether the user comments are to be propagated to one or more derived columns. In other embodiments, one or more rules can be implemented to determine whether the user comments are propagated to derived columns. In some embodiments, the user comments can be propagated to all or some of the derived columns in the life cycle of the column.

In some embodiments, target column metadata manager 235 can determine whether user comments exist for the one or more source column in a transformation step. If user comments exist for one or more source columns, target column metadata manager 235 can determine whether the user intended to propagate the user comments or whether one or more rules are satisfied that determine whether the user comments should be propagated to the target column metadata. In some embodiments, target column metadata manager 235 can automatically propagate the user comments to the target column metadata. The user comments can be stored as part of column metadata 272 at datastore 270.

In some embodiments, one or more source columns of the source dataset can be associated with one or more column level access control policies. In some embodiments, the column level access control policy can be stored or otherwise identified in source column metadata. A column level access control policy can restrict access (e.g., read, write, copy, view, or access) to a column or the data therein to persons or operations having adequate authority. In embodiments, the column level access control policy can be the same policy that is applied to the associated dataset. In other embodiments, the column level access control policy can be a policy that is specific to a particular column(s) in the dataset. For example, a first source column can have no associated column level access control policy while a second source column of the same source dataset has a restrictive column level access control policy.

In some embodiments, column level access control manager 240 can determine whether to propagate one or more column level access control policies to a respective target column, and propagate appropriate column level access control policies from the one or more source columns to a respective target column. In some embodiments, column level access control manager 240 determines whether one or more source columns are associated with a column level access control policy. For example, column level access control manager 240 can use the source column name or identifier derived from the logical query plan to search column level access control policies 280 of datastore 270 to identify any column level access control policies associated with the respective source columns. Responsive to determining that one or more source columns are associated with a column level access control policy, column level access control manger 240 can propagate the column level access control policy to the target column of the target dataset. For example, the column level access control manager 240 can associate the column level access control policy with the target column by, for example, storing the column level access control policy with the target column metadata or associating a pointer with the target column pointing to the respective one of the column level access control policies 280 stored at datastore 270.

In some embodiments, in which a data transformation step uses two or more source columns, the column level access control manager 240 can determine that at least two source columns are associated with respective level access control policies. Column level access control manager 240 can select one of these column level access control policies to propagate to the target column of the target dataset. For example, the column level access control manager 240 can propagate the most restrictive column level access control policy to the target column of the target dataset. In another example, column level access control manager 240 can use one or more rules to determine which of the multiple column level access control policies to propagate to the target column of the target dataset.

In some embodiments, the transformation code can be stored at pipeline data 278 of datastore 270. Pipeline data 278 may include data pertaining to a data pipeline including transformation code of various data transformation steps of the data pipeline. The data pipeline may be structured such that transformation code is applied to one or more source datasets to generate one or more target datasets, which may in turn be used as input to which additional transformation code is applied to generate additional target datasets, and so on. Pipeline data 278 may define the source dataset(s) and various transformation code, as well as the order in which the transformation code is to be applied and to which datasets. As noted above, data transformation code is also versioned and stored at pipeline data 278 of datastore 270. Doing so, not only provides the ability to trace dataset data to the source the dataset data is based on, but also, if the dataset is a target dataset, to the version of the transformation code used to build the target dataset.

In embodiments, user interface module 215 can proved a graphical user interface that allows a user to interface with metadata management system 110. In some embodiments, user interface module 215 can provide a visual representation of column lineage (and column metadata, generally) of the target column for presentation in a GUI at client device 130 in the form of a graph. The graph includes a node for each column in a complete column lineage. The graph further includes edges connecting the nodes. Each edge represents a derivation dependency (e.g., mapping, database operation, function) between one or more source columns represented by one or more nodes and a target column represented by a different node. The GUI allows the user to view the graph representing the column lineage of the column and edit column relationships if needed.

Figure 3A:
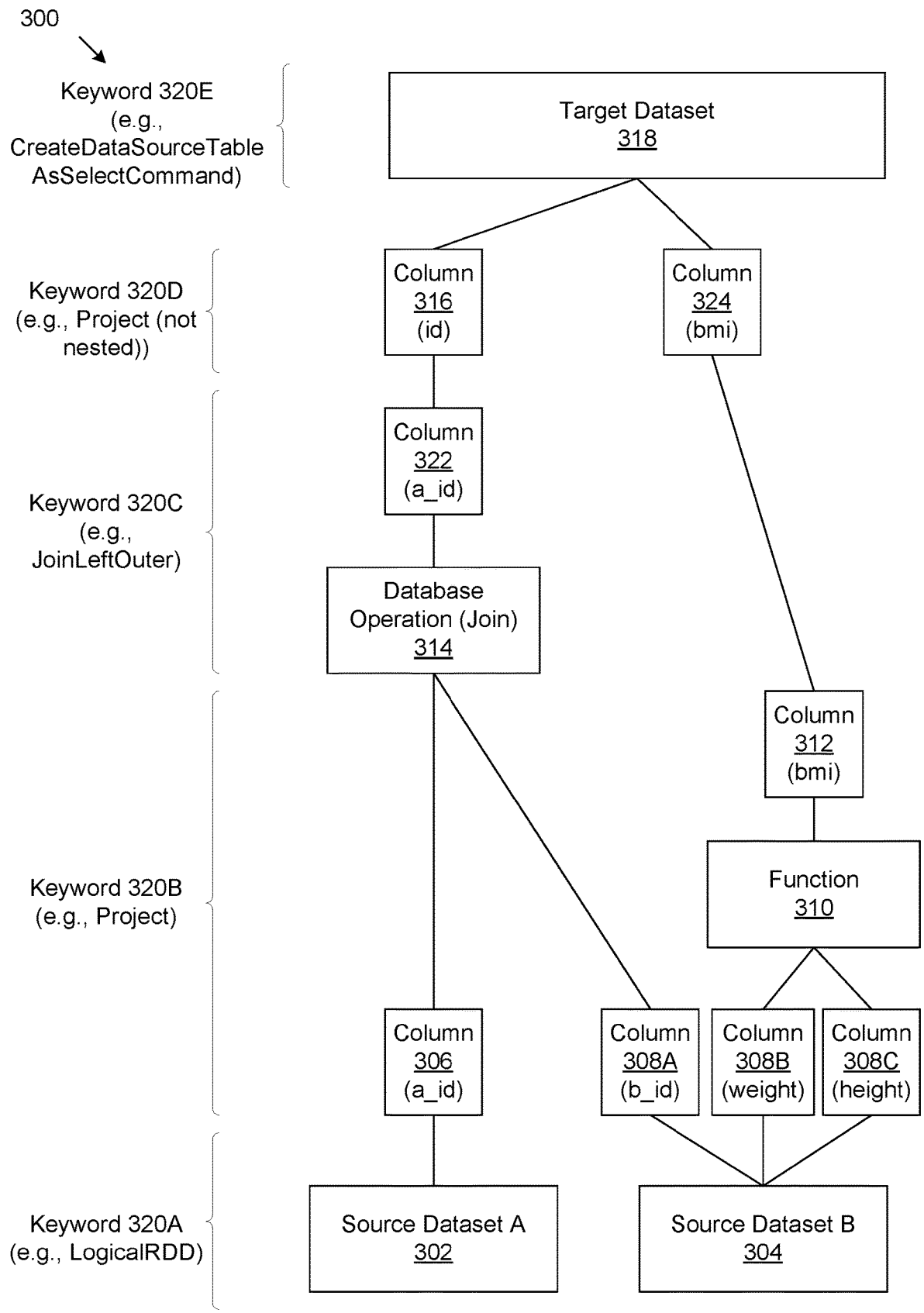
FIG. 3A illustrates a visual representation of a logical query plan, in accordance with some embodiments of the disclosure.

FIG. 3A illustrates a visual representation of a logical query plan, in accordance with some embodiments of the disclosure. As noted above, a logical query plan can refer to an ordered set of operations that is used to access data from one or more source datasets to generate one or more new target dataset(s). The logical query plan can be a hierarchical structure expressed as a tree of nodes of logical operators (e.g., relational algebraic expression). As shown, logical query plan 300 logically represents the syntactical structure of a logical query plan and that a logical query plan can include a text string that describes relationships between source columns of one or more source datasets and target columns of a target dataset(s).

Logical query plan 300 includes a tree of nodes. Each node can represent one of a source dataset(s) (e.g., source dataset A 302 and source dataset B 304), source column(s) (e.g., source columns 306, 308A, 308B, and 308C), an database operation (e.g., database operation 314), a function (e.g., function 310), a target column (e.g., target column 316 and target column 324), or a target dataset(s) (e.g., target dataset 318). The nodes can be connected by edges as illustrated by the lines that connect the various nodes.

The relationships between the source columns of the source datasets and the respective target columns of the target dataset can be illustrated by working from the bottom most nodes upwards towards the top most node of the tree of nodes. The bottom most nodes illustrate source dataset A 302 and source dataset B 304, which are the source datasets used to derive the target dataset 318. Source dataset A 302 includes source column 306 (named "a_id"). Source dataset B 304 includes source column 308A (b_id), source column 308B (weight), and source column 308C (height). Source columns 308A, 308B, and 308C are generally referred to as "source columns 308" herein.

In a first branch of the tree of nodes, a database operation 314 is performed on source column 306 of source dataset A 302 and source column 308A of source dataset B 304. In the illustrated example, a "JOIN" database operation is performed on source column 306 of source dataset A 302 and source column 308A of source dataset B. Column 322 is the resultant column of the database operation 314 performed on source column 306 and source column 308A. As illustrated, output column 322 has kept the name "a_id" used for source column 306. Output column 322 is renamed to "id" as illustrated by target column 316 and included in target dataset 318.

In a second branch of the tree of nodes, a function 310 is performed on source column 308B and source column 308C. In the illustrated example, function 310 calculates the body mass index (e.g., body mass (weight) divided by the square of the body height). Output column 312 (bmi) is the resultant column of the function 310 performed on source column 308B and source column 308C. In this example, column 312 is not renamed and passed upwards to be included as a target column 324 in target dataset 318.

In embodiments, the logical query plan 300 can include multiple portions. The portions of logical query plan 300 can be arranged (e.g., hierarchically arranged) or include a grammatical structure. The arrangement or grammatical structure or both can be used to identify particular portions of the logical query plan 300 and the respective portion's expected content. Particular portions of the logical query plan 300 identified by the aforementioned can include information about the nodes of the tree and the relationship between the nodes.

Logical query plan 300 can be associated with keywords 320A, 320B, 320C, 320D and 320E (generally referred to as "keywords 320" herein). Each of the keywords 320 can identify particular portions of the logical query plan 300 that are known to include specific information. For example, keyword 320A ("LogicalRDD") can identify one or more portions of the logical query plan that provide information about the names of the source datasets, such as source dataset A 302 and source dataset B 304.

Keyword 320B ("Project") can identify one or more portions of the logical query plan that provide information about the source columns associated with source datasets that are used to derive the target columns. Additionally, in the particular instance, the one or more portions of the logical query plan associated with keyword 320B also provide information about function 310 and the output column (e.g., output column 312) of the function 310.

Keyword 320C ("JoinLeftOuter") can identify one or more portions of the logical query plan that provide information about the database operation 314, the source columns used as input (e.g., source column 306 and source column 308A) to the database operation 314, and the output column 322.

Keyword 320D ("Project") can identify one or more portions of the logical query plan that provide information about the target columns (e.g., target column 316 and target column 324) that are included in the target dataset 318. Additionally, one or more portions of the logical query plan associated with keyword 320D also indicate that output column 322 is renamed. Output column 322 is renamed from "a_id" to "id" to produce target column 316. The data of output column 322 is not changed. Further, one or more portions of the logical query plan associated with keyword 320D also indicate that output column 312 is passed through as target column 324 without renaming or changing its data.

As shown, keyword 320D and keyword 320B can use the same keyword, "Project." However, the different portions of the logical query plan, which are signified by keyword 320D and keyword 320B, can be distinguished by the arrangement of the keywords. In the particular example, keyword 320B is nested under other keywords (e.g., keyword 320C and keyword 320D) indicating that nodes associated with keyword 320 are sub-nodes and subordinate to the nodes above. Such an arrangement can indicate that the portions of the logical query plan associated with keyword 320B are different than the portions of logical query plan associated with keyword 320D, as well as assist in determining the different types of information that are to be expected in the different portions of the logical query plan associated with keyword 320B and keyword 320D.

In some embodiments, the logical query plan 300 can be parsed to derive relationships between the source columns (e.g., source column 306 and source columns 308) of the one or more source datasets (e.g., source dataset A 302 and source dataset B 304) and the respective target columns (e.g., target column 316 and target column 324) of the target dataset (e.g., target dataset 318). In some embodiments, the parsing can be performed by parsing module 220 of metadata management system 110, as described with respect to FIG. 2.

In some embodiments, parsing the logical query plan 300 to derive the relationships between the source columns of the one or more source datasets and the respective target columns of the target dataset includes finding, in the logical query plan 300, one or more keywords associated with specific logical query plan portions (first portions) that each identify a source dataset of the source datasets. In the illustrated example, parsing module 220 can parse the logical query plan 300 to find keyword 320A ("LogicalRDD"). Each instance of keyword 320A can identify a portion(s) of the logical query plan that provides information about the names or identifiers of the source datasets, such as source dataset A 302 and source dataset B 304. If the parsing module 220 identifies keyword 320A, parsing module 220 can expect particular information in the identified portion(s) of the logical query plan 300 associated with keyword 320A and extract the particular information to identify one or more source datasets.

Parsing the logical query plan 300 to derive the relationships between the source columns of the one or more source datasets and the respective target columns of the target dataset can also include finding, in the logical query plan 300, one or more keywords associated with a specific logical query plan portion (second portion) that identifies the source columns of the source datasets. In the illustrated example, parsing module 220 can parse the logical query plan 300 to identify keyword 320B ("Project") arranged in a particular location with respect to logical query plan 300. Each instance of keyword 320B (in a particular arrangement) can identify one or more portions of the logical query plan 300 that provide information about the source columns of the source datasets that are used to derive the target columns. If the parsing module 220 identifies keyword 320B, parsing module 220 can expect particular information in the identified portion(s) of the logical query plan 300 associated with keyword 320D and extract the particular information to identify source columns of the source datasets.

Parsing the logical query plan 300 to derive the relationships between the source columns of the one or more source datasets and the respective target columns of the target dataset can further include finding, in the logical query plan, one or more keywords associated with a specific logical query plan portion (third portion) that identifies the respective target columns of the target dataset. In the illustrated example, parsing module 220 can parse the logical query plan 300 to identify keyword 320D ("Project") arranged in a particular location with respect to logical query plan 300. Each instance of the keyword 320D ("Project") in the particular arrangement can identify one or more portions of the logical query plan that provide information about the target columns (e.g., target column 316 and target column 324) included in the target dataset 318. If the parsing module 220 identifies keyword 320D, parsing module 220 can expect particular information in the identified portion(s) of the logical query plan 300 associated with keyword 320D and extract the particular information to identify the respective target columns of the target dataset.

Parsing the logical query plan 300 to derive the relationships between the source columns of the one or more source datasets and the respective target columns of the target dataset can also include finding, for each of the respective target columns of the target dataset, one or more keywords associated with a specific logical query plan portion (fourth portion) describing a relationship between at least one of the source columns of the source datasets and the respective target column of the target dataset. In the illustrated example, parsing module 220 can parse the logical query plan 300 to identify keyword 320C ("JoinLeftOuter"). Each instance of keyword 320C can identify one or more portions of the logical query plan that provide information about the relationships between the source column 306 and source column 308A and target column 316. If the parsing module 220 identifies keyword 320C, parsing module 220 can expect particular information in the identified portion(s) of the logical query plan 300 associated with keyword 320C and extract the particular information to identify the relationships between one or more source columns and a respective target column. For instance, source column 306 of source dataset A 302 is joined with source column 308A of source dataset B 304 to create output column 322. It can be noted that several of the keywords 320 can be used to extract relationship information between the source columns of one or more source datasets and the respective target columns of the target dataset. For example, keyword 320D can be used to locate a logical query portion indicating that output column 322 is renamed to produce target column 316 and that output column 312 is passed through to target column 324 without renaming. In another example, keyword 320B can be used to locate a logical query portion that includes information about the relationship of the output column (e.g., output column 312) and source columns 308B and 308C (e.g., transformed via function 310). At each of the identified portion(s) of the logical query plan that are identified by each keyword, part of the derived relationships between the source columns of the one or more source datasets and a respective target column of a target dataset(s) can be created. Each part of the derived relationships can be combined until a full derived relationship model is created. The full derived relationship model can include a complete description of the derived relationships as expressed in the logical query plan. A (full) derived relationship model is further described with respect to FIG. 3B.

In some embodiments, the relationship between the source column(s) of the source dataset(s) and the respective target column of the target dataset can be defined based on a mapping between the name(s) of the source column(s) and the name of the target column (e.g. renaming of a column or pass through of a column name), a database operation performed on the source column(s) to derive the target column (e.g., JOIN), or a function used to calculate values of the target column using values of the source column(s) (e.g. calculation of body mass index values).

Figure 3B:
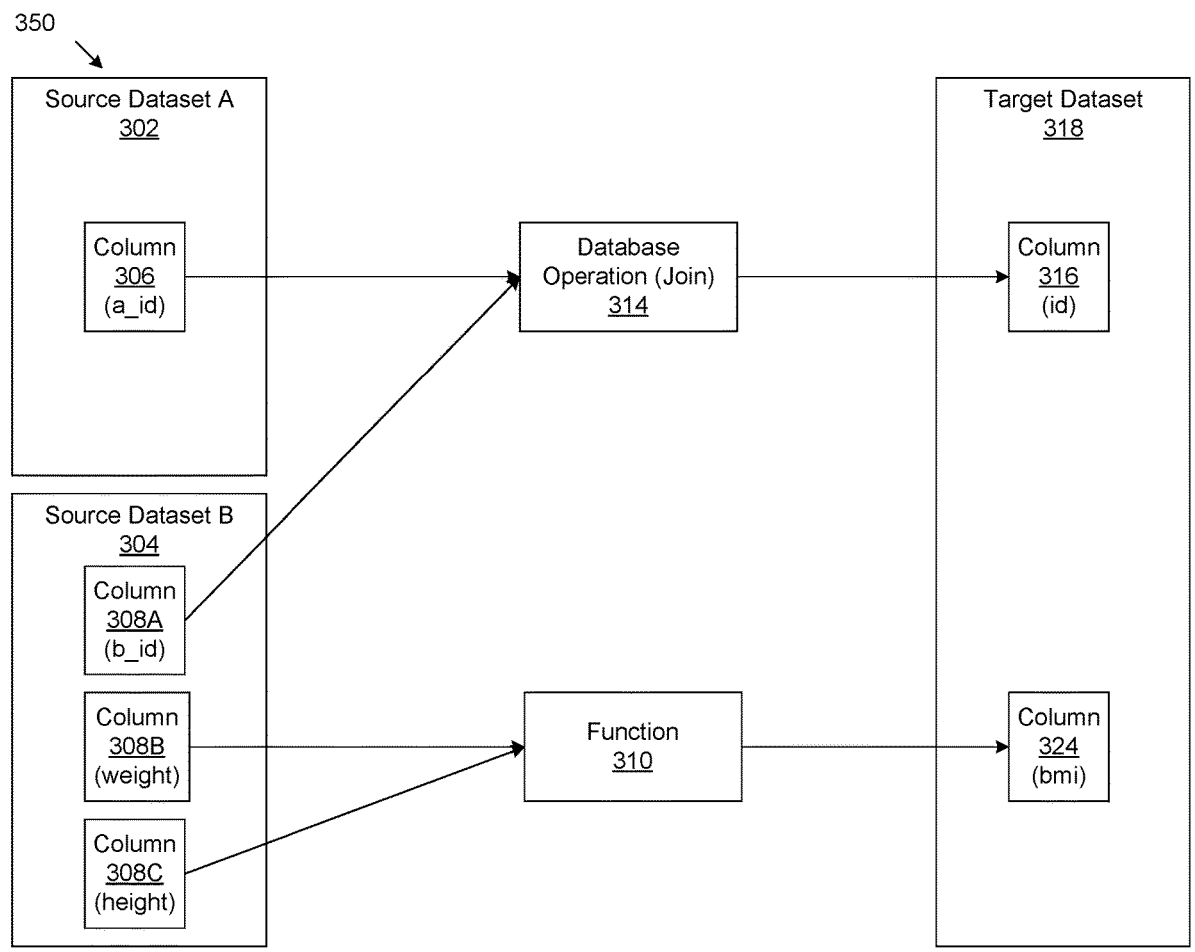
FIG. 3B illustrates a visual representation of derived relationships between one or more source columns and respective target columns using the logical query plan of FIG. 3A, in accordance with some embodiments.

FIG. 3B illustrates a visual representation of derived relationships between one or more source columns and respective target columns using the logical query plan of FIG. 3A, in accordance with some embodiments. Derived relationships model 350 shows a simplified version of the derived relationships of the source columns of the source datasets and the respective target columns of the target dataset using logical query plan 300 illustrated in FIG. 3A. It can be noted that not all of the derived relationships from logical query plan 300 of FIG. 3A are illustrated (e.g., renaming a target column 316).

Derived relationships model 350 shows that source column 306 is part of source dataset A 302, and that source columns 308 are part of source dataset B 304. A database operation 314 is performed on source column 306 of source dataset A 302 and source column 308A of source dataset B 304 to derive target column 316 of target dataset 318. A function 310 is performed on source column 308B and source column 308C to generate target column 324 of target dataset 318. Target dataset 318 includes two target columns, target column 316 and target column 324.

Figure 4:
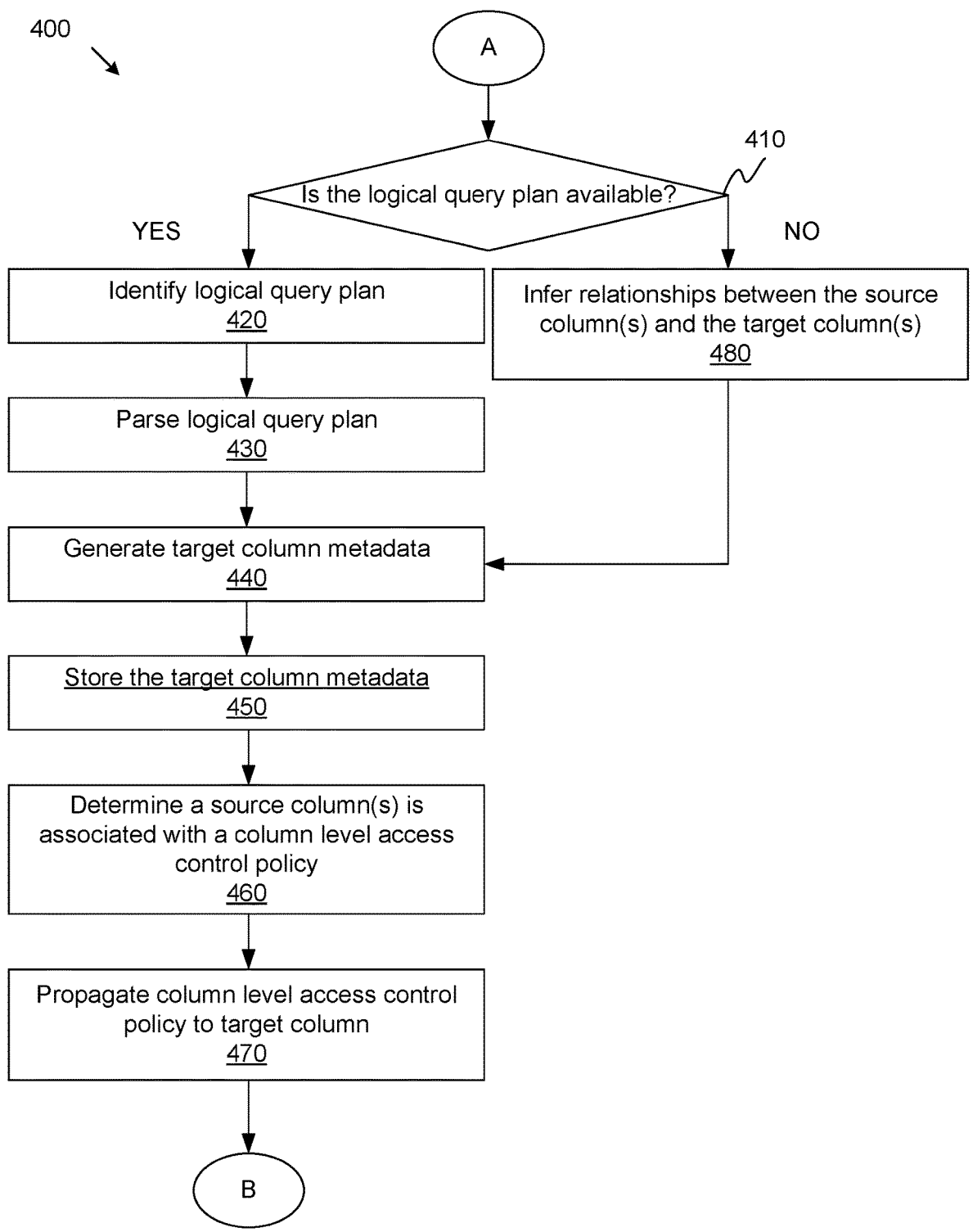
FIG. 4 is a flow diagram illustrating a method of generating column metadata for a target column of a target dataset, in accordance with some embodiments.

FIG. 4 is a flow diagram illustrating a method of generating column metadata for a target column of a target dataset, in accordance with some embodiments. The method 400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 400 may be performed by metadata management system 110, as shown in FIGS. 1 and 2. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 4, at operation 410, processing logic executing method 400 determines whether a logical query plan is available for transformation code in a first programming language. As noted above, the transformation code can be in one of multiple programming languages, and a logical query plan can be generated for each transformation code in one of the multiple programming languages. The generated logical query plans can all have the same (uniform) syntax such that the logical query plans are program language agnostic with respect to the transformation code. In some embodiments, a logical query plan may not be generated for a particular transformation code. If a logical query plan is available for a particular transformation code, processing logic proceeds to operation 420. If a logical query plan is not available for the transformation code, processing logic proceeds to operation 480.

In some embodiments, the target column metadata is generated responsive to receiving a request to build a target dataset(s). Building the target dataset(s) can refer to a request to generate a target dataset(s) by, for example, executing respective transformation code to produce the target dataset(s). For example, responsive to building a target dataset(s), the query plan can be identified (e.g., operation 420) and parsed (e.g., operation 430), and target column metadata for the one or more target columns can be generated (e.g., operation 440). In embodiments, the target column metadata is generated responsive to one or more events, such as responsive to a user request to generate the target column metadata or responsive to a user selecting a user interface element of a GUI for the presentation of column provenance. In some embodiments, the transformation code is inspected to identify any changes between two most recent instances of transformation code associated with a target dataset(s). Responsive to determining any changes between the two most recent instances of the transformation code, the most recent instance of the transformation code can be used to generate the target column metadata for one or more target of column of the target dataset(s).

At operation 420, processing logic identifies the logical query plan to derive a target dataset from one or more source datasets. The logical query plan is generated from transformation code in a first programming language. The logical query plan identifies multiple source columns of the source dataset(s) and respective target columns of the target dataset.

At operation 430, processing logic parses the logical query plan to derive relationships between the multiple source columns of the source dataset(s) and the respective target columns of the target dataset.

At operation 440, processing logic generates target column metadata for a target column of the target dataset. The target column metadata can reflect a derived relationship between one or more source columns and the target column and existing source column metadata of each of the source columns.

In some embodiments, in order to generate the target column metadata for the target column of the target dataset, processing logic can determine existing lineage metadata associated with each of the source columns. Processing logic can provide the existing lineage metadata associated with each of the source columns for inclusion with the target column metadata for the target column of the target dataset.

In some embodiments, in order to generate the target column metadata for the target column of the target dataset, processing logic can identify user comments within the existing source column metadata of each of the source columns. Processing logic can provide the user comments for inclusion with the target column metadata for the target column of the target dataset.

At operation 450, processing logic stores the target column metadata for the target column of the target dataset. As discussed above, the target column lineage metadata can be stored in the form of a graph.

At operation 460, processing logic determines whether the source columns are associated with a column level access control policy. In some embodiments, processing logic can determine that the source columns are associated with different column level access control policies.

At operation 470, responsive to determining that the source columns are associated with the column level access control policy, processing logic propagates the column level access control policy to the target column of the target dataset. In embodiments where the source columns are associated with different column level access control policies, processing logic selects one of the column level access control policies to propagate to the target column of the target dataset.

As noted above, responsive to determining that the logical query plan is not available for the transformation code in the first programming language, processing logic proceeds to operation 480. At operation 480, processing logic infers the relationships between the source columns of the one or more source datasets and the columns of the target dataset.

In one embodiment, to infer the relationships between the source columns of the one or more source datasets and the columns of the target dataset, processing logic identifies, based on a record of datasets, one or more datasets that are source dataset candidates.

For example, datastore 105 or datastore 270 can include a record (e.g., catalogue) of datasets of the data pipeline. In some embodiments, the record of datasets can be the source dataset candidates. In some embodiments, the record of datasets of the data pipeline can be filtered to determine a subset of the record of datasets that are source dataset candidates. For example, the record of datasets can be filtered such that the subset of the record of datasets includes datasets that have been accessed within a threshold time period.

In some embodiments, to infer the relationships between the source columns of the one or more source datasets and the columns of the target dataset, processing logic finds, for each target column, one or more source column candidates from the source dataset candidates. In some embodiments, to find, for each target column, one or more source column candidates from the source dataset candidates, processing logic compares at least one of data types or column names of the columns of the source dataset candidates to data types of the respective target columns of the target dataset. A data type can refer to a particular kind of data item as defined by the values it can take. Examples of data types include, strings, integers, floating point, character, Boolean, among others.

For example, processing logic can compare the names of the source columns of the source dataset candidates to the names of each target column of the target dataset to determine a similarity score. Processing logic can identify source columns of the source dataset candidates that have a similarity score greater than a threshold as source column candidates for a respective target column.

In another example, processing logic can compare the data types of the source columns of the source dataset candidates to the data type of each target column of the target dataset to determine a match. Processing logic can identify for any source columns of the source dataset candidates that have data types that match a target column as source column candidates for a respective target column. In still another example, processing logic can identify source columns of the source dataset candidates that have a similarity score greater than a threshold and have data types that match a target column as source column candidates for a respective target column.

In some embodiments, processing logic can infer, for each target column, a relationship between the one or more source column candidates and the target column of the target dataset based on values in the one or more source column candidates and the target column of the target dataset.

For example, processing logic can compare the values of the target column to the values of one or more source column candidates to determine a match. If all the values match, processing logic can infer a relationship between the respective target column and the one or more source column candidates. In another example, processing logic can perform a function on the one or more source column candidates (or a combination of the one or more source column candidates) and infer a relationship between one or more of the source column candidates and a respective target column based on a same output value. For instance, the average value can be computed for every one of source column candidates and the respective target column. If the average value of a source column candidate matches the value of the respective target column, a relationship can be inferred between the source column candidate and the respective target column.

In another embodiment, in order to identify the source dataset candidates, the transformation code can be parsed to identify names or identifiers that conform to names or identifiers generally used for source datasets. It can be noted that the transformation code can be parsed in a similar manner as described with respect to parsing the logical query plan, but for the programming language of the transformation code may not be initially known. Each programming language used to construct the transformation code can be a different programming language that has its own unique grammar and syntax. The transformation code can be parsed for keywords that can identify the particular programming language used for the transformation code. After the particular programming language of the transformation code is identified, a parser designed for the particular programming language can parse the transformation code for keywords associated with one or more portions of the transformation code that identify one or more source datasets, one or more portions of the transformation code that identify source columns of the one or more source dataset, one or more portions of the transformation code that identify target columns of the target dataset, one or more portions of the transformation code that describe the relationship between the source column(s) of the source dataset(s) and the respective target column of the target dataset.

In embodiments, subsequent to inferring relationships between source columns of the source dataset(s) and the target columns of the target dataset, processing logic can proceed to operation 440.

Figure 5:
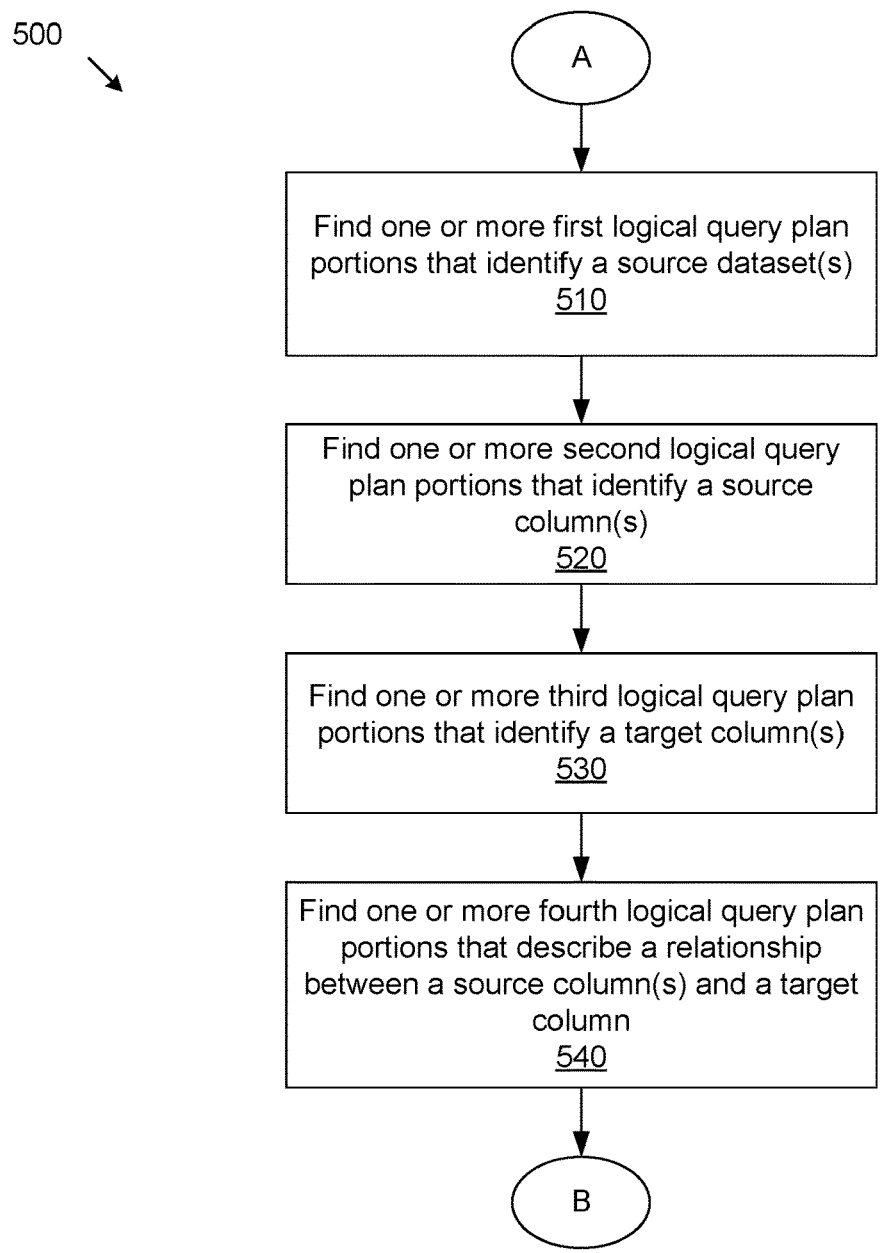
FIG. 5 is a flow diagram illustrating a method of parsing the logical query plan to derive relationships between source columns of one or more source datasets and respective target column of the target dataset, in accordance with some embodiments.

FIG. 5 is a flow diagram illustrating a method of parsing the logical query plan to derive relationships between source columns of one or more source datasets and respective target column of the target dataset, in accordance with some embodiments. It can be noted that method 500 can correspond to operation 430 of FIG. 4. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by metadata management system 110, as shown in FIGS. 1 and 2. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

At operation 510 of method 500, processing logic finds, in the logical query plan, one or more keywords associated with one or more first logical query plan portions that each identify a source dataset of the source datasets. At operation 520, processing logic finds, in the logical query plan, one or more keywords associated with a second logical query plan portion that identifies the source columns of the source datasets. At operation 530, processing logic finds, in the logical query plan, one or more keywords associated with a third logical query plan portion that identifies the respective target columns of the target dataset. At operation 540, processing logic finds, for each of the respective target columns of the target dataset, one or more keywords associated with a fourth logical query plan portion describing a relationship between at least one of the source columns of the source datasets and the respective target column of the target dataset.

In some embodiments, the relationship between the one source column and the respective target column can be represented by a mapping between the name(s) of the source column(s) and the name of target column, a database operation performed on the source column(s) to derive the target column, or a function used to calculate values of the target column using values of the source column(s). Parsing the logical query plan is described in greater detail above with respect to FIGS. 2 and 3A.

Figure 6:
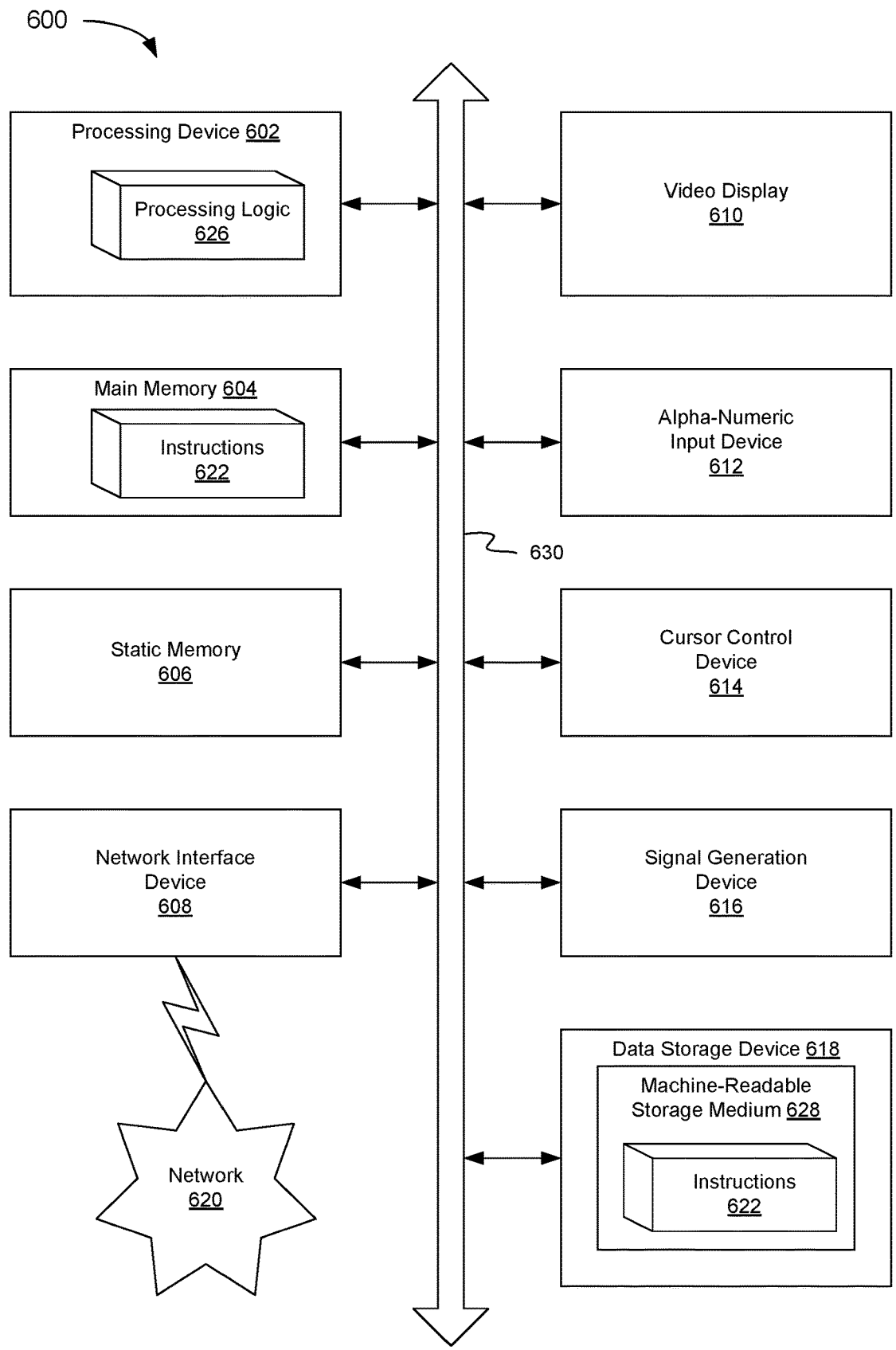
FIG. 6 is a block diagram illustrating a computer system, in accordance with some embodiments.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as a server of data management platform 102 running metadata management system 110 or a client computing system 130.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein. In some embodiments, processing logic 626 can execute metadata management system 110, as described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608. In some embodiments, instructions 622 can include instructions to execute metadata management system 110, as described herein.

The machine-readable storage medium 628 may also be used to store instructions of column lineage and metadata propagation, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    determining, by a processing device, whether a logical query plan to derive a target dataset from one or more source datasets is available, wherein the logical query plan was generated from transformation code in a first programming language and comprises a hierarchical structure expressed as a tree of nodes of logical operators, wherein the logical query plan identifies a plurality of source columns of the one or more source datasets and respective target columns of the target dataset;
    responsive to determining that the logical query plan is not available for the transformation code in the first programming language, inferring relationships between the plurality of source columns of the one or more source datasets and the respective target columns of the target dataset;
    generating target column metadata for a target column of the target dataset, the target column metadata reflecting the inferred relationships between the plurality of source columns of the one or more source datasets and the respective target columns; and
    storing the target column metadata for the target column of the target dataset.

2. The method of claim 1, further comprising:
    responsive to determining that the logical query plan is available for the transformation code in the first programming language, parsing the logical query plan to derive relationships between the plurality of source columns of the one or more source datasets and the respective target columns of the target dataset;
    deriving relationships between the plurality of source columns of the one or more source datasets and the respective target columns of the target dataset; and
    generating the target column metadata for the target column of the target dataset, the target column metadata reflecting a derived relationship derived from the logical query plan and between one or more source columns of the plurality of source columns and the target column and reflecting existing source column metadata of each of the one or more source columns.

3. The method of claim 2, wherein parsing the logical query plan to derive the relationships between the plurality of source columns of the one or more source datasets and the respective target columns of the target dataset, comprises:
    finding, in the logical query plan, one or more keywords associated with one or more first logical query plan portions that each identify a source dataset of the one or more source datasets;
    finding, in the logical query plan, one or more keywords associated with a second logical query plan portion that identifies the plurality of source columns of the one or more source datasets;
    finding, in the logical query plan, one or more keywords associated with a third logical query plan portion that identifies the respective target columns of the target dataset; and
    finding, for each of the respective target columns of the target dataset, one or more keywords associated with a fourth logical query plan portion describing a relationship between at least one of the one or more source columns of the one or more source datasets and the respective target column of the target dataset.

4. The method of claim 3, wherein the relationship between at least one source column of the one or more source datasets and the respective target column of the target dataset is at least one of a mapping between a name of the one or more source columns and a name of the respective target column, a database operation performed on the one or more source columns to derive the respective target column, or a function used to calculate values of the respective target column using values of the one or more source columns.

5. The method of claim 1, wherein generating the target column metadata for the target column of the target dataset, further comprises:
    determining existing lineage metadata associated with each of one or more source columns of the plurality of source columns; and
    providing the existing lineage metadata associated with each of the one or more source columns for inclusion with the target column metadata for the target column of the target dataset.

6. The method of claim 1, wherein generating the target column metadata for the target column of the target dataset further comprises:
    identifying user comments within existing source column metadata of each of one or more source columns of the plurality of source columns; and
    providing the user comments for inclusion with the target column metadata for the target column of the target dataset.

7. The method of claim 1, further comprising:
    determining whether one or more source columns of the plurality of source columns are associated with a column level access control policy; and
    responsive to determining the one or more source columns are associated with the column level access control policy, propagating the column level access control policy to the target column of the target dataset.

8. The method of claim 7, wherein the one or more source columns comprise at least two source columns, the method further comprising:
    determining that the at least two source columns are associated with a plurality of column level access control policies; and
    selecting one of the plurality of column level access control policies to propagate to the target column of the target dataset.

9. The method of claim 1, wherein inferring the relationships between the plurality of source columns of the one or more source datasets and the respective target columns of the target dataset, comprises:

identifying, based on a list of datasets, one or more datasets that are source dataset candidates;

finding, for each of the respective target columns, one or more source column candidates from the source dataset candidates; and inferring, for each of the respective target columns, a relationship between the one or more source column candidates and a respective target column of the respective target columns of the target dataset based on values in the one or more source column candidates and the target column of the target dataset.

10. The method of claim 9, wherein finding, for each of the respective target columns, the one or more source column candidates from the source dataset candidates comprises:

comparing at least one of data types or column names of a plurality of columns of the source dataset candidates to data types or column names of the respective target columns of the target dataset.

11. The method of claim 1, further comprising:

providing a graphical user interface comprising a graph representing column lineage of the target column; and modifying the column lineage of the target column based on user input via the graphical user interface.

12. A system comprising:

a memory; and a processing device, coupled with the memory, configured to perform operations comprising:

determining whether a logical query plan to derive a target dataset from one or more source datasets is available, wherein the logical query plan was generated from transformation code in a first programming language and comprises a hierarchical structure expressed as a tree of nodes of logical operators, wherein the logical query plan identifies a plurality of source columns of the one or more source datasets and respective target columns of the target dataset;

responsive to determining that the logical query plan is not available for the transformation code in the first programming language, inferring relationships between the plurality of source columns of the one or more source datasets and the respective target columns of the target dataset;

generating target column metadata for a target column of the target dataset, the target column metadata reflecting the inferred relationships between the plurality of source columns of the one or more source datasets and the respective target columns; and storing the target column metadata for the target column of the target dataset.

13. The system of claim 12, the operations further comprising:

responsive to determining that the logical query plan is available for the transformation code in the first programming language, parsing the logical query plan to derive relationships between the plurality of source columns of the one or more source datasets and the respective target columns of the target dataset;

deriving relationships between the plurality of source columns of the one or more source datasets and the respective target columns of the target dataset; and generating the target column metadata for the target column of the target dataset, the target column metadata reflecting a derived relationship derived from the logical query plan and between one or more source columns of the plurality of source columns and the target column and reflecting existing source column metadata of each of the one or more source columns.

14. The system of claim 12, wherein generating the target column metadata for the target column of the target dataset, further comprises:

determining existing lineage metadata associated with each of one or more source columns of the plurality of source columns; and providing the existing lineage metadata associated with each of the one or more source columns for inclusion with the target column metadata for the target column of the target dataset.

15. The system of claim 12, the operations further comprising:

determining whether one or more source columns of the plurality of source columns are associated with a column level access control policy; and responsive to determining the one or more source columns are associated with the column level access control policy, propagating the column level access control policy to the target column of the target dataset.

16. The system of claim 12, wherein inferring the relationships between the plurality of source columns of the one or more source datasets and the respective target columns of the target dataset, comprises:

identifying, based on a list of datasets, one or more datasets that are source dataset candidates;

finding, for each of the respective target columns, one or more source column candidates from the source dataset candidates; and inferring, for each of the respective target columns, a relationship between the one or more source column candidates and a respective target column of the respective target columns of the target dataset based on values in the one or more source column candidates and the target column of the target dataset.

17. The system of claim 16, wherein finding, for each of the respective target columns, the one or more source column candidates from the source dataset candidates comprises:

comparing at least one of data types or column names of a plurality of columns of the source dataset candidates to data types or column names of the respective target columns of the target dataset.

18. A non-transitory computer-readable medium comprising instructions that, responsive to execution by a processing device, cause the processing device to perform operations comprising:

determining, by the processing device, whether a logical query plan to derive a target dataset from one or more source datasets is available, wherein the logical query plan was generated from transformation code in a first programming language and comprises a hierarchical structure expressed as a tree of nodes of logical operators, wherein the logical query plan identifies a plurality of source columns of the one or more source datasets and respective target columns of the target dataset;

responsive to determining that the logical query plan is not available for the transformation code in the first programming language, inferring relationships between the plurality of source columns of the one or more source datasets and the respective target columns of the target dataset;

generating target column metadata for a target column of the target dataset, the target column metadata reflecting the inferred relationships between the plurality of source columns of the one or more source datasets and the respective target columns; and storing the target column metadata for the target column of the target dataset.

19. The non-transitory computer-readable medium of claim 18, wherein inferring the relationships between the plurality of source columns of the one or more source datasets and the respective target columns of the target dataset, comprises:

identifying, based on a list of datasets, one or more datasets that are source dataset candidates;

finding, for each of the respective target columns, one or more source column candidates from the source dataset candidates; and inferring, for each of the respective target columns, a relationship between the one or more source column candidates and a respective target column of the respective target columns of the target dataset based on values in the one or more source column candidates and the target column of the target dataset.

20. The non-transitory computer-readable medium of claim 19, wherein finding, for each of the respective target columns, the one or more source column candidates from the source dataset candidates comprises:

comparing at least one of data types or column names of a plurality of columns of the source dataset candidates to data types or column names of the respective target columns of the target dataset.

* * * * *